United States Patent Office 3,707,403
Patented Dec. 26, 1972

3,707,403
ELECTRICAL CONDUCTORS COATED WITH POLYESTERIMIDES FROM DICYANO DI-AMIDE-HYDRAZINE REACTION PRODUCTS
Arnold Dobbelstein, Junkersdorf Kries Cologne, and Hans-Dieter Hille, Wuppertal-Elberfeld, Germany, and Horst Holfort, Mexico City, Mexico, assignors to Dr. Kurt Herberts & Co. vorm Otto Louis Herberts, Christbusch Wuppertal-Barmen, Germany
No Drawing. Continuation-in-part of application Ser. No. 855,039, Sept. 3, 1969. This application Mar. 29, 1971, Ser. No. 129,207
Claims priority, application Germany, July 23, 1969, P 19 37 311.6
Int. Cl. H01b 3/42
U.S. Cl. 117—218                              9 Claims

ABSTRACT OF THE DISCLOSURE

Disclosed are electrical conductors insulated with polyesterimide resins containing 5-membered imide rings. The resins are formed from polyhydric alcohols, polyvalent aromatic carboxylic acids and polyvalent amino compounds, optionally in admixture with other aliphatic and/or aromatic polyvalent carboxylic acids. A portion of the polyvalent amino compounds is the reaction product of dicyano diamide with hydrazine. The electrical conductors include an outer coating of a polyamideimide resin.

CROSS-REFERENCE TO RELATED APPLICATION

This application is a continuation-in-part of copending application, Ser. No. 855,039, filed Sept. 3, 1969, now U.S. Pat. No. 3,629,201, dated Dec. 21, 1971.

BACKGROUND OF THE INVENTION

This invention relates to a process for the production of polyester resins containing 5-membered imide rings, to their use in the production of stoving insulation and to a process for the production of insulating coatings on electric conductors.

Processes for the production of polyester imide resins suitable for lacquering electric conductors are already known (cf. British patent specifications Nos. 937,377; 1,082,181; 1,067,541; 1,067,542 and 1,127,214; Belgian patent specification No. 663,429; French patent specification No. 1,391,834; East German patent specification No. 30,838; German Offenlegungsschriften 1,494,454 and 1,494,413.

After they have been baked or stoved on to copper wire, lacquer films of conventional polyester imide resins show outstanding thermal stability, excellent elasticity, a high resistance to solvents and satisfactory behaviour in heat-shock tests. The pencil hardness of these lacquer films usually amounts to between 3 and 4H and can only be increased at the expense of an appreciable loss of elasticity. However, pencil hardnesses in excess of 5H are desirable because the requirements which the surfaces of enamelled wires have to satisfy in view of modern winding processes of the kind used in the manufacture of motors and rotors, have risen very considerably.

The object of the present invention is to produce new polyester resins containing imide groups which, after stoving on to electric conductors, give coatings of improved hardness.

Surprisingly, it has now been found that this object can be achieved without in any way affecting the other excellent properties of conventional resins, providing reaction products of dicyano diamide with hydrazine prepared at temperatures between room temperature and around 280° C. are condensed into the polyester resin. Accordingly, the present invention relates to a process for the production of polyesters which contain 5-membered imide rings and/or which form 5-membered imide rings when heated to temperatures above 250° C. from polyhydric alcohols, polyvalent aromatic carboxylic acids containing at least 2 carboxyl groups in the ortho-position and at least one other functional group, and polyvalent amino compounds optionally in admixture with other aliphatic and/or aromatic polyvalent carboxylic acids, or from reactive derivatives of these compounds, which process is distinguished by the fact that from 5 to 100 mol percent of the polyvalent amino compounds used as starting product, based on the total quantity of polyvalent amino compounds, consist of reaction products of dicyano diamide with hydrazine prepared at temperatures between room temperature and about 280° C.

Thus, the polyester resins containing 5-membered imide rings prepared by the process according to the invention differ from conventional polyester resins containing imide rings in that they contain the aforementioned reaction products of dicyano diamide with hydrazine condensed into them as a new component. The remaining components or starting products condensed into the resins may be the same as in conventional polyester resins containing imide groups. Reference is made in this connection to the Patent Specifications quoted earlier on. For this reason, there is no need to provide a comprehensive list of the various possible reaction components.

Preferred starting materials for the process according to the invention include reaction products of dicyanodiamide with hydrazine that have been prepared at temperatures of from about 30 to about 120° C. Reaction products of this kind are preferably condensed in in quanties of from about 10 to 50 mol percent, based on the total quantity of polyvalent amino compounds and reaction products of dicyano diamide with hydrazine. In addition, it is preferred to prepare these reaction products by reacting dicyano diamide and hydrazine in a molar ratio of from 0.8:1 and 1:5, preferably in a molar ratio of 1:1 to 1:1.8, advantageously in an organic solvent miscible with hydrazine and/or water at the temperature indicated above. It is possible in this way to obtain a solution which may be used either as such, i.e. without any need to isolate the reaction products beforehand, for the preparation of the polyester resin according to the invention. It is of particular advantage to use a solvent which does not interfere in any way with the reaction with the other starting components and which does not have to be removed. Accordingly, it is preferred to use as solvents for the reaction between dicyano diamide and hydrazine for example polyhydric alcohols which can in any case be used as further reaction components.

There is no need for the reaction product of dicyano diamide with hydrazine to be an individual chemically specific compound. On the contrary, this reaction product is usually a mixture of several compounds, although this mixture can be used in accordance with the invention. Providing dicyano diamide and hydrazine are used in suitable quantities and the reaction conditions applied are suitably selected, it is possible preferentially to obtain 3,5-diamino-1,2,4-triazole (U.S. Pat. 2,648,671) as reaction product. In addition, the pyroguanazole obtained at elevated temperature from dicyano diamide and hydrazine (K. A. Hoffman and O. Ehrhardt, Berichte der Deutschen Chemischen Gesellschaft 45/12 (1912), pages 2731–2740) may also be used.

According to the prior art, trimellitic acid and/or its anhydride is preferably used as the carboxylic acid containing at least two carboxyl groups in the ortho-position and at least one other functional group. This acid or its anhydride is also preferably used in the process according to the invention. The process according to the invention may be carried out by reacting the polyvalent carboxylic acid containing at least two carboxyl groups in the ortho-position and at least one other functional group first with the reaction product of dicyano diamide and hydrazine to form bis-3,5-(carboxylic acid amido)-1,2,4-triazole and/or bis-3,5-(carboxylic acid imido)-1,2,4-triazole and then with the other starting materials. The aforementioned triazoles formed as intermediate products may be reacted after isolation and purifications or directly in the form of the reaction solutions with the other starting components to form the polyester resins according to the invention. If as already mentioned trimellitic acid or a derivative thereof (anhydride and/or ester) is used as the carboxylic acid, bis-3,5-(trimellitic acid imido)-1,2,4-triazole and/or bis-3,5-(trimellitic acid imido)-1,2,4-triazole are formed as intermediate products in the reaction with 3,5-diamino-1,2,4-triazole. These compounds are crystallised substances which can readily be isolated in highly pure form without any need for special purification stages.

The present invention also relates to the use of the polyester resins defined above in the production of stoving insulations on electric conductors and to a process for the production of insulating coatings on electric conductors by coating the conductors with a thermosetting lacquer solution and heating the conductors thus coated to elevated temperature, which process is distinguished by the fact that the lacquer solution contains polyester resins prepared in accordance with the above definition. Production of the polyester resins and/or production of the insulating coatings by stoving at elevated temperatures may be carried out in known manner optionally in the presence of conventional catalysts and/or other auxiliaries. There is no need to provide a detailed list here either because catalysts and/or auxiliaries of this kind are discussed at length in the Patent Specifications quoted earlier. The polyester resins prepared in accordance with the present invention may also be mixed with other resins in order thus to obtain stoving insulations on electric conductors with mixtures of this kind or their solutions.

The insulating coatings on electric conductors produced by the process according to the invention show the outstanding properties of conventional polyester imide resins, but a much greater hardness of from 7 to 8H which hitherto had been considered impossible. This is an extremely surprising technical effect which hitherto it has been impossible to achieve with highly heat resistant insulating coatings.

An additional feature of the invention resides in use of the polyester imide resins as base coatings on electrical conductors which are to be provided with multiple resinous coatings. Such an electrical conductor exhibiting particularly good resistance to abrasion and very good heat resistance is obtained by applying to an electrical conductor a base coating of a polyester imide resin containing 5-membered imide rings as described hereinabove, and thence applying an outer coating of a polyamide-imide resinous material. Resins of this latter type are well known in the art as exemplified by U.S. Pats. Nos. 3,425,866; 3,347,828; 3,428,486; and 3,475,212; and British Pat. No. 1,155,230.

The invention is illustrated by the following examples.

Examples 1 to 7 illustrate the production of the polyester resins in accordance with the invention.

EXAMPLE 1

97.0 g. (0.5 mol) of dimethylterephthalate,
348.0 g. (1.3 mols) of tris-(2-hydroxyethyl)-isocyanurate
186.0 g. (3 mols) of ethylene glycol are introduced together with 30 g. of commercial cresol into a three-necked flask equipped with stirring mechanism, thermometer and column. Following the addition of 1 g. of butyl titanate, the contents of the flask are heated in a nitrogen atmosphere. Distillation of the methanol liberated by trans-esterification begins at around 140 to 150° C. 32 g. of methanol have been distilled off after some 3 hours when the temperature amounts to 220° C.

After cooling to around 170° C., 288 g. (1.5 mols) of trimellitic acid anhydride and 149 g. (0.75 mol) of 4,4'-diamino diphenylmethane are added and condensed in by heating to 200–220° C. until 54 g. of water have been distilled off.

After cooling to around 170° C., 288 g. (1.5 mols) of trimellitic acid anhydride and 74.2 g. (0.75 mol) of 3,5-diamino-1,2,4-triazole are added and condensed at 200–220° C. until another 54 g. of water have been distilled off.

Ethylene glycol is then distilled off in vacuo at 200° C. until the viscosity of the resin as measured on a 30% solution in m-cresol at 25° C., amounts to 1012 cp. The resin is then diluted with commercial cresol into a 50% solution.

EXAMPLE 2

349 g. (1.8 mols) of dimethyl terephthalate,
120 g. (1.3 mols) of glycerine,
124 g. (2 mols) of ethylene glycol and
100 g. of cresol are transesterified with 1.0 g. of zinc acetate at a temperature of up to 220° C. in a three-necked flask equipped with stirring mechanism, thermometer and rectification column. 116 g. of methanol are distilled off.

After cooling to around 170° C., 192.0 g. (1 mol) of trimellitic acid anhydride,
99.0 g. (0.5 mol) of 4,4'-diamino diphenylmethane, and
19.8 g. (0.2 mol) of 3,5-diamino-1,2,4-triazole are added. 36 g. of water are distilled off by continued heating up to 220° C.

Another 192.0 g. (1 mol) of trimellitic acid anhydride,
99.0 g. (0.5 mol) of 4,4'-diamino diphenylmethane, and
19.8 g. (0.2 mol) of 3,5-diamino-1,2,4-triazole are added to the melt cooled to around 170° C. After another 36 g. of water have been distilled off, glycol is distilled off by increasing the temperature to 240° C., until the resin has a viscosity of 1830 cp. as measured on a 33.3% solution in m-cresol at 25° C. The resin is dissolved in commercial cresol to form a 50% solution.

EXAMPLE 3

A resin is condensed as described in Example 2, except that the two portions each of 19.8 g. of 3,5-diamino-1,2,4-triazole were each replaced by 66 g. of a solution obtained as follows:

420 g. (5 mols) of dicyanodiamide
900 g. of ethylene glycol
500 g. of water, and
340 g. (5.5 mols) of 80% hydrazine hydrate were slowly heated with stirring to 100° C. in a flask. The ammonia given off was introduced into excess 3 n-hydrochloric acid. After some 8 hours, titration of the hydrochloric acid initially introduced showed that 93.5% of the quantity of ammonia theoretically expected had been removed from the reaction mixture. Water and a small hydrazine excess were then removed in a water-jet vacuum. A clear yellowish brown solution containing a reaction product of dicyano diamide and hydrazine was obtained in a yield of 1.58 kg.

EXAMPLE 4

230 g. (1.2 mols) of trimellitic acid, anhydride,
99 g. (0.5 mol) of 4,4'-diamino diphenylmethane,
9.9 g. (0.1 mol) of 3,5-diamino-1,2,4-triazole,
35 g. (0.56 mol) of ethylene glycol,
65 g. (0.25 mol) of tris-(2-hydroxyethyl)-isocyanurate
300 g. of cresol are heated with 1 g. of zinc acetate in a three-necked flask equipped with stirring mechanism, thermometer and rectification column. The heating rate is regulated in such a way that the temperature at the head of the column does not exceed 102° C. After 7 hours, the temperature of the flask is 184° C., the product has become clear, and 45 ml. of water and a little cresol are distilled off.

After another 4 hours' heating to 200° C., the contents of the flask are diluted with 100 g. of cresol to form an approximately 50% resin solution.

EXAMPLE 5

97.0 g. (0.5 mol) of dimethyl terephthalate,
348.0 g. (1.3 mols) of tris-(2-hydroxyethyl)-isocyanurate
186.0 g. (3.0 mols) of ethylene glycol are transesterified in the same way as described in Example 1.

After cooling to around 170° C., 288 g. (1.5 mols) of trimellitic acid anhydride and
149 g. (0.75 mol) of 4,4'-diamino diphenylmethane are added, and the reaction mixture is heated until 54 g. of water have been distilled off.

After cooling to 170° C., 288 g. (1.5 mols) of trimellitic acid anhydride,
129 g. (0.65 mol) of 4,4'-diamino diphenylmethane and
9.9 g. (0.1 mol) of 3,5-diamino-1,2,4-triazole are added and the mixture heated until another 54 g. of water have been distilled off. Some of the ethylene glycol is distilled off in vacuo at 200° C. The resin has a viscosity of 1050 cp. as measured on a 30% solution in m-cresol at 25° C.

The resin is diluted with commercial cresol to form a 50±1% resin solution.

EXAMPLE 6

97 g. (0.5 mol) of dimethyl terephthalate.
348 g. (1.3 mols) of tris-(2-hydroxyethyl)-isocyanurate, and
186 g. (3.0 mols) of ethylene glycol are transesterified in the same way as described in Example 1.

After cooling to around 170° C., 288 g. (1.5 mols) of trimellitic acid anhydride and
149 g. (0.75 mol) of 4,4'-diamino diphenylmethane are added and the reaction mixture heated until 54 g. of water have been distilled off.

After cooling to 170° C., 288 g. (1.5 mols) of trimellitic acid anhydride,
77 g. (0.39 mol) of 4,4'-diamino diphenylmethane and
59 g. (0.24 mol) of pyroguanazole (prepared in accordance with K. A. Hoffman and O. Erhardt, Berichte der Deutschen Chemischen Gesellschaft 45/12 (1912), pages 2731–2740)

are added and the mixture heated until another 54 g. of water have been distilled off.

In other respects, the procedure is as described in Example 1. A 50% resin solution in commercial cresol is prepared.

EXAMPLE 7

194 g. (1.0 mol) of dimethyl terephthalate,
348 g. (1.3 mols) of tris-(2-hydroxyethyl)-isocyanurate
186 g. (3.0 mols) of ethylene glycol are transesterified in the same way as described in Example 1 until 64 g. of methanol have been distilled off.

After cooling to around 170° C., 410 g. (0.75 mol) of bis-4,4'-(trimellitic acid imido)-diphenylmethane and
112 g. (0.25 mol) of bis-3,5-(trimellitic acid imido)-1,2,4-triazole are added and the mixture heated until 36 g. of water have been distilled off.

In other respects, the procedure is as described in Example 1. A 50% resin solution in commercial cresol is prepared.

If in this example the bis-3,5-(trimellitic acid imido)-1,2,4-triazole is replaced by an equimolar quantity (121 g.) of bis-3,5-(trimellitic acid-1-amido)-1,2,4-triazole, a resin with the same properties is obtained.

The bis-3,5-(trimellitic acid imido)-1,2,4-triazole was prepared as follows:

105 g. of hydrazine hydrochloride are dissolved in 300 ml. of water, 84 g. of dicyanodiamide are added to the resulting solution in a flask equipped with stirring mechanism, thermometer and reflux condenser and the mixture carefully heated. At around 30° C. there is an exothermic reaction, producing an increase in the temperature of the solution to around 50–60° C. The reaction mixture is stirred for 3 hours at that temperature. The resulting solution thus contains a reaction product of dicyano diamide and hydrazine. Following the addition of 384 g. of trimellitic acid anhydride to this solution, the solution is brought to the boil. After 8 hours' boiling under reflux, the yellow deposit precipitated is filtered off and washed with a little water. After drying at 80° C. in a vacuum drying cabinet, 440 g. (around 91% of the theoretical) of bis - 3,5 - (trimellitic acid-1-amido)-1,2,4-triazole with an acid number of 460 mg. KOH/g. are obtained. 484 g. of this compound which may also be used as a starting material in the process according to the invention, are heated for 8 hours at 180° C. in a vacuum drying cabinet. The corresponding imido compound is formed through ring closure. Bis-3,5-(trimellitic acid imido)-1,2,4-triazole with an acid number of 250.5 is obtained in a yield of 445 g. (99% of the theoretical yield).

COMPARISON TEST 1

Following the prior art, a resin is prepared as described in Example 5, except that the 3,5-diamino-1,2,4-triazole used in Example 5 is replaced by an equimolar quantity (19.8 g.) of 4,4'-diamino diphenylmethane. A 50% resin solution in commercial cresol is prepared.

The following Example 8 describes the use of the polyesters prepared in accordance with Examples 1 to 7 in the production of stoving insulations and the process for the production of insulating coatings on electric conductors.

EXAMPLE 8

Lacquers of the following composition are prepared from the resin solutions in accordance with Examples 1 to 7 and Comparison Test 1:

| | Parts |
|---|---|
| 50% resin solutions in cresol | 60.00 |
| Commercial cresol | 15.00 |
| Solvent naphtha | 15.00 |
| Polymeric butyl titanate | 0.30 |
| Xylene | 9.70 |
| | 100.00 |

These lacquers are applied in 6 layers to a 0.8 mm. diameter copper wire by means of roller and felt in a horizontal wire-lacquering oven 3 metres long at a temperature of from 410 to 450° C., and then hardened. The wire is lacquered at a rate of 9 to 13 metres per minute.

Testing of the lacquered wires produced the results set out in Table 1.

TABLE 1

| | Lacquer prepared from the resin according to— | | | | | | | |
|---|---|---|---|---|---|---|---|---|
| | Ex. 1 | Ex. 2 | Ex. 3 | Ex. 4 | Ex. 5 | Ex. 6 | Ex. 7 | Comparison test 1 |
| Pencil hardness | 8 H | 8 H | 8 H | 7 H | 6 H | 8 H | 8 H | 4 H |
| Pencil hardness after 30 minutes' storage in ethanol at 60° C | 8 H | 8 H | 8 H | 7 H | 6 H | 7-8 H | 8 H | 4 H |
| Heat shock test 30 mins. at 200° C | S | S | S | S | S | S | S | S |
| 30 mins. at 250° C | S | Cracks | S | S | S | S | S | S |
| Winding strength when wire is wound around its own diameter after pre-elongation (percent) | 20 | 15 | 15 | 25 | 25 | 25 | 20 | 25 |

Note.—S=Satisfactory.

Examples 9 and 10 illustrate the preparation of electrical conductors having multiple insulating coatings wherein the base coating is a polyester imide resin containing 5-membered imide rings.

EXAMPLE 9

To a coated conductor produced in accordance with Examples 1 and 8 there is applied 2 additional layers of a polyamide-imide resin (Resin AI 537 sold by Amoco Chemicals Corp.) formulated in an 18% solution. The layers are applied in a horizontal wire lacquering oven by means of roller and felt as in Example 8. The resulting multiple-coated wire exhibits particularly good abrasion and heat resistance.

EXAMPLE 10

The procedure of Example 9 is repeated using a second polyamide-imide resin (L 2255 sold by Farbenfabriken Bayer, Leverkusen, Germany). The insulating electrical conductors obtained again show excellent abrasion and heat resistance.

We claim:
1. An insulated electrical conductor comprising an electrical conductor coated with a polyester resin comprising the condensation product of an aromatic polycarboxylic acid having at least 2 carboxyl groups in the ortho-position and at least one other functional group, a polyhydrice alcohol, and a polyamino compound wherein from about 5 to about 100 mol percent of the total amount of polyamino reactants is a reaction product of dicyano diamide with hydrazine in a molar ratio of from about 0.8:1 to about 1:5, said reaction product being prepared at temperatures up to about 280° C.

2. An insulated electrical conductor as defined by claim 1, wherein the polyester resin further comprises a second aromatic polycarboxylic acid, an aliphatic polycarboxylic acid or mixtures thereof.

3. An insulated electrical conductor as defined by claim 1, wherein the reaction product of dicyano diamide and hydrazine is present in an amount of from 10 to 50 mol percent, based on the total amount of polyamino reactants.

4. An insulated electrical conductor as defined by claim 1, wherein the reaction product of dicyano diamide with hydrazine is prepared at temperatures between 20 and 130° C.

5. An insulated electrical conductor as defined by claim 1, wherein the dicyano diamide and the hydrazine are reacted in a molar ratio of from about 1:1 to about 1:1.8.

6. An insulated electrical conductor as defined by claim 1, wherein the reaction product is 3,5-diamino-1,2,4-triazole.

7. An insulated electrical conductor as defined by claim 1, wherein the reaction product is pyroguanazole.

8. An insulated electrical conductor as defined by claim 1, wherein the polycarboxylic acid is a member selected from the group consisting of trimellitic acid, trimellitic acid anhydride and mixtures thereof.

9. An insulated electrical conductor as defined by claim 1, further comprising an outer coating of a polyamide-imide resin.

References Cited

UNITED STATES PATENTS

| 3,382,203 | 5/1968 | Rating et al. | 260—75 N X |
| 3,458,480 | 7/1969 | Schmidt et al. | 260—75 N |
| 3,493,413 | 2/1970 | Olson et al. | 117—218 |

RALPH HUSACK, Primary Examiner

U.S. Cl. X.R.

117—128.4, 161 K, 161 P, 232